Oct. 27, 1964 C. M. BLACKBURN ETAL 3,154,093

FUEL PRESSURIZATION SYSTEM

Filed Sept. 8, 1961 2 Sheets-Sheet 1

CHARLES M. BLACKBURN
JOHN DASSOULAS
INVENTORS

BY W. O. Duesenberry
Claude Funkhouser

ATTORNEYS

Oct. 27, 1964

C. M. BLACKBURN ETAL 3,154,093

FUEL PRESSURIZATION SYSTEM

Filed Sept. 8, 1961

CHARLES M. BLACKBURN
JOHN DASSOULAS
INVENTORS

BY

ATTORNEYS

United States Patent Office 3,154,093
Patented Oct. 27, 1964

3,154,093
FUEL PRESSURIZATION SYSTEM
Charles M. Blackburn and John Dassoulas, Silver Spring, Md., assignors to the United States of America as represented by the Secretary of the Navy
Filed Sept. 8, 1961, Ser. No. 136,963
2 Claims. (Cl. 137—255)

This invention relates generally to fuel pressurization systems; more particularly, it relates to a fuel pressurization system for use in an aerial missile.

In the design of an aerial missile it is essential that the center of gravity thereof be maintained within certain critical limits under all conditions encountered during flight. Since the center of gravity of a missile depends upon the centers of gravity of its various components, the design of each component must be such that its center of gravity is maintained within certain prescribed limits. The location of the center of gravity of the fuel supply system is unstable because it is constantly shifting during flight due to fuel consumption and varying acceleration and deceleration forces acting thereon.

It has been found that the center of gravity of the fuel supply system can be maintained within acceptable limits by providing three tandem arranged fuel tanks and sequentially emptying them, starting with the forward tank. In the present invention, this is accomplished by connecting each tank to a common source of pressurized gas, the connection to the forward tank being unrestricted and the connections to the remaining tanks having pressure responsive valves therein. Fuel is forced from the forward tank by the pressurized gas until the tank is empty, at which time the pressure valve in the connection to the second tank will open to admit gas therein. Gas is similarly admitted to the aft tank after the second tank has been exhausted of fuel.

Accordingly, it is an object of the present invention to provide a fuel pressurization system for withdrawing fuel from a plurality of tanks in a predetermined sequence.

Another object of the invention is to provide a fuel pressurization system utilizing a source of compressed gas connected to a plurality of fuel tanks, the first tank being connected by an unrestricted conduit and the remainder being connected by conduits having pressure responsive valves therein.

A further object of the invention is to provide a fuel pressurization system that is simple, compact, and reliable in operation.

Other objects and many of the attendant advantages of the present invention will be readily appreciated as the same becomes better understood by reference to the following detailed description when considered in connection with the accompanying drawings, wherein.

Figure 1:
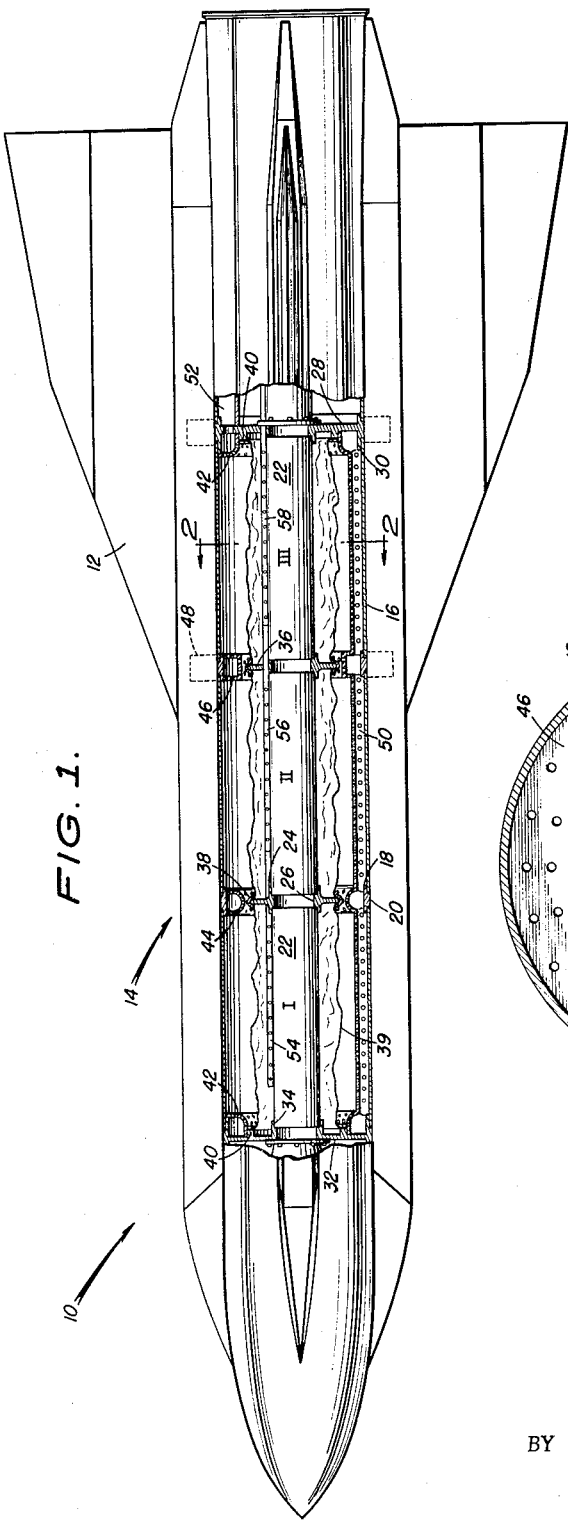
FIG. 1 is a side elevation of a missile, shown partially in section, the fuel tank arrangement of the present invention being incorporated therein.
Figure 2:
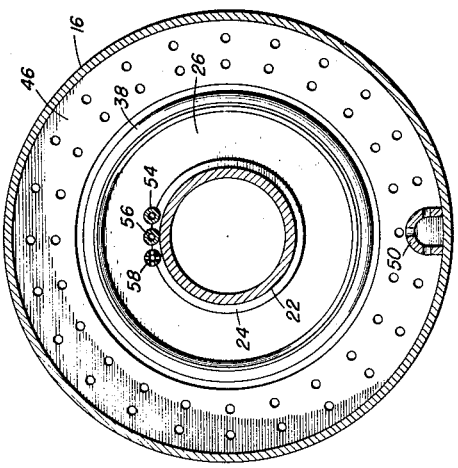
FIG. 2 is an enlarged section, on line 2—2 of FIG. 1, omitting the missile wings and the bladder for purposes of clarity.

Referring to FIGS. 1 and 2, a missile 10 having wings 12 has mounted in the central portion thereof an annular fuel tank 14. The tank comprises an outer cylinder and a concentric inner cylinder, the outer cylinder forming a continuation of the outer casing of the missile body, and the inner cylinder forming part of the diffuser. The outer cylinder consists of three spaced, relatively short elements 16 secured as by welding to the annular flanges 18 of two annular support plates 20, the flanges being recessed an amount equal to the thickness of the walls of the elements 16 so that a smooth continuous outer surface is provided. Similarly, the inner cylinder consists of three spaced sections 22, substantially equal in length to the elements 16, and secured as by welding to the recessed annular flanges 24 of annular plates 26. Annular end plates 28 are fastened as by welding to the ends of elements 16 by annular flanges 30, said plates having an inside diameter slightly larger than the diameter of the inner sections 22. Smaller annular end plates 32 are fastened as by welding to the ends of the sections 22 by annular flanges 34 which substantially abut the inner ends of plates 28. The plates 28 and 32 are fastened to each other by a plurality of circumferentially spaced bolts or the like, suitably sealed to prevent any fuel leakage.

Integral with each annular plate 26 is a bulkhead 36 extending radially outwardly slightly beyond the midpoint between the inner and outer cylinders. Secured to the bulkheads by annular clamps 38 is an expandable cylindrical bladder 39, the length of which is substantially equal to the length of the fuel tank 14. The ends of the bladder 39 are clamped to annular ribs 40, formed on the end plates 28 to receive a plurality of clamping bolts or the like. Suitable seals (not shown) are provided to prevent fuel leakage around the ends of the bladder.

Secured to each end plate 28, as by welding to its flange 30 and rib 40, is an annular, arcuately shaped, perforated metal strip 42 forming a collector tube in conjunction with the end plate. Perforated annular collector tubes 44 and 46 are secured to the forward and aft plates 20 and are spaced short distances from the clamps 38. It will be seen that the bulkheads 36 and the collector tubes 44 and 46 divide the fuel tank into three compartments, hereinafter referred to as tanks I, II, and III, tank I being the forward tank and tank III being the aft tank. Any of the collector tubes may be formed so as to withstand structural loads exerted thereon, the aft tube 42 and the tube 46 being shown as supporting wing attaching units 48. Connecting the annular collector tubes 42, 44, and 46 is an axially directed perforated collector tube 50 which may be welded to each said annular tube. Connecting the aft collector tube 42 through a suitable aperture in the aft end plate 28 is a fuel outlet pipe 52 leading to the fuel pump (not shown).

Extending through suitable sealed ports in the aft end plate 28 are three conduits 54, 56, and 58 for delivering pressurized gas to the fuel tank between the bladder 39 and the inner elements 16. The conduit 54 extends the entire length of the tank 14 through suitable ports in the bulkheads 36 and is provided with a plurality of outlets in the tank I region. The conduit 56 extends through a port in the aft bulkhead 36 and terminates in tank II, outlets being provided in the part of the conduit in tank II. The conduit 58 terminates in tank III and is also provided with a plurality of outlets within said tank.

Figure 3:
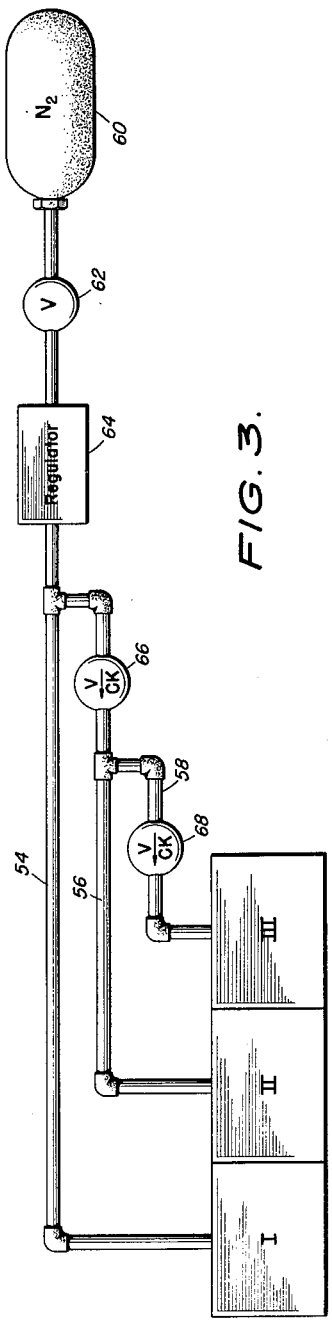
FIG. 3 is a schematic representation of the fuel pressurization system.

Referring now to FIG. 3, wherein the pressurization system is schematically shown, a source of pressurized nitrogen is indicated at 60 and is connected through a valve 62 to a pressure regulator 64. It is the function of the regulator 64 to permit nitrogen to enter the bladder 39 at a pressure sufficient to force fuel from the tank but not at an excessive pressure, since the pressure differential acting on the diffuser or inner cylinder must be kept below that level which will cause it to collapse. Tank I is connected to the regulator by the unrestricted conduit 54, tank II is connected by conduit 56 tapped from conduit 54, and tank III is connected by conduit 58 tapped from conduit 56. A spring loaded check valve 66 is provided in conduit 56 between the tap for conduit 58 and the regulator 64, and an identical check valve 68 is provided in the conduit 58. The check valves may thus be considered as being series connected.

In operation, the tank 14 is filled with fuel between the bladder 39 and the outer cylinder elements 16. When it is desired to ignite the missile rocket motor the valve 62 is opened and nitrogen is supplied at a pressure dictated by the regulator 64. The nitrogen will follow the path of least resistance through the unrestricted conduit 54 and into the bladder chamber in tank I, expanding the bladder to force fuel into the collector tubes 42, 44, and 50 through the perforations thereof. The fuel from tank I will flow through the collector tube 50, into the aft collector tube 42 and through the outlet pipe 52 to the pump.

After tank I has been exhausted of fuel, the bladder therein will be fully expanded so that further admission of nitrogen thereto will build up pressure in line 54 until it is sufficient to open check valve 66 to allow the bladder in tank II to be expanded to force fuel therefrom. This pressure build-up is very rapid and occurs almost instantly upon the exhaustion of fuel from tank I. After tank II is exhausted, the valve 68 will be opened in the same manner as valve 66. Due to the arrangement of the valves, upon the exhaustion of tank I, the valve 66 is exposed to nitrogen before the valve 68; therefore, both valves may have the same spring loading. Fuel will not leak back into tank I after it has been emptied because the expanded bladder therein will seal the perforations in the collector tubes.

Due to deceleration forces occurring during flight, the fuel in tank I will at times be under a greater pressure than the fuel in tanks II and III, and likewise, the fuel in tank II will at times be under a greater pressure than the fuel in tank III. Therefore, in order to be assured of the proper sequence of emptying, the spring loading of valve 66 should be greater than the pressure differential between tanks I and II, and the spring loading of valve 68 should be greater than the pressure differential between tanks II and III.

Figure 4:
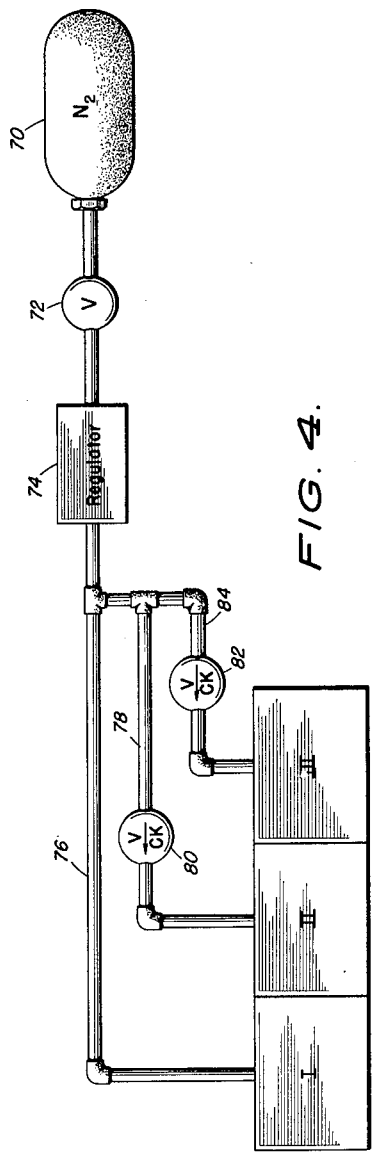
FIG. 4 is a schematic representation of a modified fuel pressurization system.

A modified pressurization system is schematically represented in FIG. 4, wherein a source of pressurized nitrogen 70, a valve 72, and a pressure regulator 74 are shown. An unrestricted conduit 76 connects the regulator with tank I, and a conduit 78 having a spring loaded check valve 80 therein is tapped from the conduit 76 to connect the regulator 74 with tank II. A spring loaded check valve 82 is provided in a conduit 84, which is tapped from the conduit 76 and is connected to tank III. The valves 80 and 82 may thus be considered as being parallel connected. The check valve 82 has a greater spring loading than the check valve 80 so that the latter valve opens first. The valve 80 should be set to open at a greater pressure than the maximum pressure differential encountered during flight between the fuel pressure in tank I and tank II. Similarly, the valve 82 should be set to open at a greater pressure than the maximum pressure differential encountered between the fuel pressure in tanks II and III.

In operation, nitrogen will flow through the unrestricted conduit 76 to expand the bladder in tank I. After that tank is emptied, the spring of check valve 80 will be overcome by the force exerted by pressurized nitrogen to permit the bladder in tank II to be expanded. The third tank is similarly exposed to nitrogen by the opening of valve 82 upon the exhaustion of fuel in tank II.

It should now be evident that the present invention provides a simple reliable system for ensuring the proper sequence of fuel withdrawal from a plurality of tanks, and it should also be understood that the invention need not be limited to the three tank system described.

Obviously, many other modifications and variations of the present invention are possible in the light of the above teachings. It should therefore be understood that within the scope of the appended claims the invention may be practiced otherwise than as specifically described.

What is claimed is:

1. In an aerial missile, a fuel pressurization system comprising,
    at least two fuel tank sections arranged coaxially in tandem, each tank section consisting of an outer and an inner cylindrical shell,
    a bulkhead closing the end of each tank section,
    outlet means located in said bulkheads and communicating between said tank sections,
    a source of pressurized gas,
    and means in each tank to confine the gas admitted to that tank to said tank,
    conduits connecting said pressurized gas source with the means in each tank section and permitting the pressurized gas to expand, thereby forcing the fuel from said tank section, and
    a normally closed valve mounted on each of the conduits except one,
    each said valve being spring loaded to open automatically at a predetermined gas pressure differential, whereby said tank sections will be exhausted of fuel individually in a predetermined sequence and the center of gravity of the missile will be maintained within allowable limits.

2. The fuel pressurization system of claim 1, in which all of said conduits are joined at a common connection, said connection being located on the input side of said valves.

References Cited in the file of this patent
UNITED STATES PATENTS

| | | |
|---|---|---|
| 2,402,826 | Lubbock | June 25, 1946 |
| 2,612,216 | Samiran | Sept. 30, 1952 |
| 2,621,719 | Eaton et al. | Dec. 16, 1952 |
| 3,104,526 | Hirschfeld et al. | Sept. 24, 1963 |